Oct. 26, 1965     T. C. SHIRLEY ETAL     3,214,066
COUPLING MECHANISM AND DEVICES INCORPORATING SAME
Filed Feb. 21, 1963

Thomas C. Shirley
BY Austin E. Elmore

ATTORNEYS

United States Patent Office 3,214,066
Patented Oct. 26, 1965

3,214,066
COUPLING MECHANISM AND DEVICES
INCORPORATING SAME
Thomas C. Shirley, 3370 Freeman Road, Walnut Creek,
Calif., and Austin E. Elmore, South Pasadena, Calif.;
said Elmore assignor to said Shirley
Filed Feb. 21, 1963, Ser. No. 260,212
8 Claims. (Cl. 222—209)

Our invention relates, in general, to apparatus employing coupled tubular components and, more particularly, to an improved joint coupling arrangement and to devices incorporating such arrangement.

Certain aspects of the present invention are disclosed but are not specifically claimed in our copending application entitled Metering and Dispensing Unit for Fluidic Materials. Various of said aspects disclosed in the aforesaid application are also disclosed in the present application with other embodiments and modifications which are specifically claimed herein. In general, the aspects of the aforesaid copending application which are of relevance herein are related to improved means for coupling conduit members to a container or reservoir. In a basic sense such means is adaptable for use in many types of devices, apparatus and/or coupling joints other than the particular apparatus of the foregoing application in which different or similar size conduit members or other tubular devices are to be secured in aligned and mutually sealed relation. Difficulties of several varieties arise in coupling devices provided heretofore in that alignment may not be positive permitting excessive strains to be applied across sealing surfaces causing leakage. Also, the provision of couplings to match various size hoses, conduits, container neck sizes and like tubular elements generally connates a large selection of specially manufactured fittings and/or couplings as well as multiple expensive molds and the like if molding techniques are to be employed to produce the necessary fittings.

Our invention provides coupling arrangements and devices incorporating such arrangements which minimize difficulties experienced with prior devices and which are especially adapted for fabrication by conventional molding techniques. As a prime feature of the invention there is provided a coupling arrangement in which interchangeable sleeve fittings of a particular design are utilized to adapt the couplings for use with various sizes and to provide other desirable characteristics such as assuring proper alignment and improved sealing.

Accordingly it is an object of our invention to provide an improved fitting for coupling conduits and other tubular elements in a sealed relation.

Another object of our invention is to provide a mechanism for coupling conduits and other tubular elements in an aligned sealed relation.

Still another object of our invention is to provide a mechanism for coupling conduits and other tubular elements in which an interchangeable or replaceable sleeve element is utilized to effect alignment and sealing of the coupled elements.

A further object of our invention is to provide a mechanism for coupling conduits and other tubular elements in which different diameter size interchangeable sleeve elements having circumferential fins are utilized to effect alignment and sealing of the coupled elements.

A still further object of our invention is to provide articles of manufacture incorporating a coupling mechanism in which different size interchangeable sleeve elements having circumferential fins for accommodating to variable size fitting to provide alignment and sealing of components thereof.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

With reference to said drawing:

FIGURE 1 is an elevational view with portions broken away of a pressure bulb arrangement incorporating the coupling joint mechanism of the invention.

FIGURE 2 is an elevational view with portions broken away of the pressure bulb of FIGURE 1 incorporating an adapter sleeve in accordance with the invention to facilitate aligned sealed coupling of the bulb to a conduit, pipe, or the like.

Figures 1, 2:
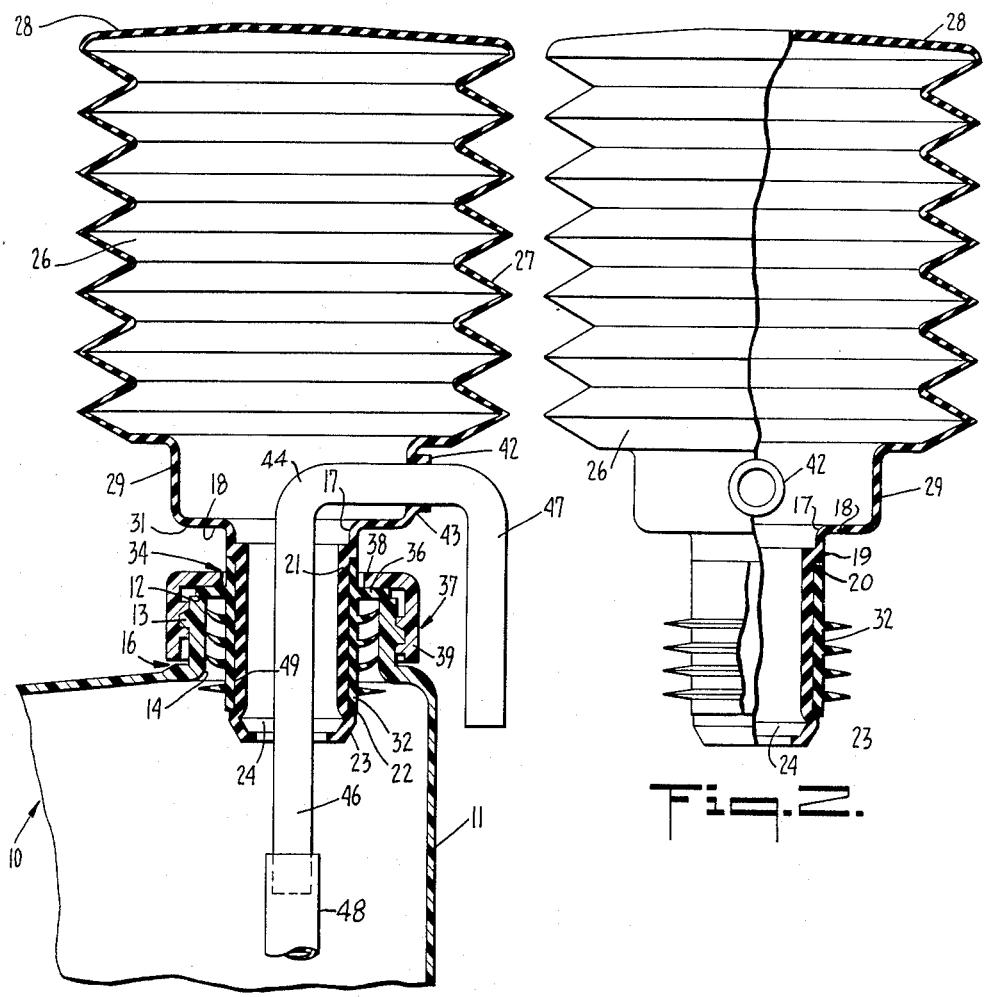

Considering now the invention in some detail and referring to the form illustrated in the drawing, the coupling mechanism of the invention utilizes or, alternatively, is utilized in conjunction with a first tubular member to which a connection is to be established. Means associated with said tubular member is provided in order to permit mechanical attachment of a second tubular member of which a portion is of smaller diameter and projects within said first tubular member. In accordance with a salient feature of the invention a sleeve member provided with a series of circumferential flexible rib projections is disposed upon said projecting portion of the second tubular member to position and align same within the first tubular member. Such sleeve member may also be provided with a flanged shoulder suitable for engagement with the end region of said first tubular member for purposes of sealing and fastening as described more fully hereinafter.

More particularly, details of the coupling mechanism utilized in a typical manner for coupling a pressure bulb to a container are illustrated in FIGURE 1 of the drawing. The bottleneck of such a container 10 (shown fragmentarily) may comprise a typical truncated cylindrical tubular section 11 having a planar or preferably a chamfered end face 12 provided with an external thread 13 or the like to afford a means for attachment. For the purposes of the invention, tubular neck section 11 is provided with a substantially smooth interior wall surface 14 of generally cylindrical configuration and being generally concentric within the exterior tubular surface 16. It will be apparent that such a bottleneck configuration may be provided in other tubular arrangements utilized for other purposes such as for conduit and hose connections or the like.

A tubular member in the form of a bulb neck 17 may be utilized as the second tubular member of the coupling mechanism; however, any similar tubular member, conduit, hose or the like may be similarly adapted and utilized. In its essentials, as may best be seen in FIGURE 2, the bulb neck 17 or equivalent tubular member should include a cylindrical collar section 18 having a constricted generally cylindrical extension 19 providing an exterior circumferential shoulder 21 therebetween. The extension portion 19 should have a length of at least equivalent to that of internal neck wall surface 14 and being of a diameter somewhat less than the internal diameter of said neck surface to provide space for a sleeve member described hereinafter. Likewise, a low elevated ridge 22 is provided on the nose end of bulb neck extension 19 and said nose end is preferably terminated in a rounded or truncated conically tapered tip 23 having an open axial orifice 24. Ordinarily the bulb neck 17 or similar tubular member is made of rigid metal or molded of rigid plastic suitable for the service use intended. A semi-rigid plastic, e.g., high impact polystyrene, polyvinylidene chloride, etc., can be used if some flexibility is desired or can be tolerated.

A preferred type of compressible bulb 26 is provided in the form of a convoluted cylindrical bellows body 27 molded of a flexible material such as rubber or thermoplastic resin with a flattened or convex upper end 28. The lower end of bellows body 27 is constricted inwardly somewhat to join a rigid or semi-rigid cylindrical neck portion 29 which in turn is joined by the annular shoulder 31 to the collar section 18 of said bulb neck. Such bulb 26 may be used when appropriately fitted for various purposes as described more fully hereinafter.

For the purpose of effecting alignment and sealing of the tubular member, e.g., the bulb neck 17, of previous mention, there is provided an especially constructed adapter sleeve 32. Such sleeve is provided in the form of a cylindrical tubular sleeve portion 33 having an overall length equivalent to that of the cylindrical bulb neck extension 19 and having an internal diameter whereby sleeve 33 may be pressed over the bulb tip 23 into a tight fit position along said neck extension 19 and be securely retained by ridge 22. The tubular exterior surface 34 of sleeve 33 is of a generally cylindrical diameter usually less than the internal diameter of the first tubular member on interior neck surface 14 whereby the sleeve may be inserted therein when mounted as shown. Near the upper end of said sleeve 33 there is provided an outwardly flanged shoulder 36 having a maximum diametric dimension of about the external diameter of bottleneck end face 12 against which said shoulder may abut when the coupling is assembled. A locking ring 37 having a centrally perforated cap portion 38 fitting about the upper end of sleeve 33 and a depending internally threaded skirt portion 39 may be employed to securely lock said sleeve 33 and assembled bulb neck to container neck 11.

Now it will be apparent that if a standard size second tubular element, e.g., a bulb neck is to be inserted within a graded size variety of first tubular elements, e.g., a container neck, the second element must have a maximum external diameter of at most the internal diameter of the smallest of the first elements. Accordingly, a loose fit conductive to misalignment, lack of rigidly and likelihood of poor sealing can result. To overcome these difficulties, sleeve 32 is provided with a series of flexible tapering thickness outwardly extending circumferential fins 41 which have a maximum diameter at least slightly exceeding the diameter of interior neck surface 14 whereby, upon insertion of the bulb neck into the container neck 11 such fins are deflected to provide a centering force. Such force is effective to properly align shoulder 36 with respect to end face 12 as well as stabilize the concentric functioning of the two respective tubular elements. In addition, the circumferential fins 41 provide at least supplementary sealing of the joint between the members.

It will be appreciated that a wide variety of sizes of tubular members to be coupled may be encountered, depending upon their particular application and other factors. Accordingly, in order that such varied sizes of tubular members may be accommodated, it is preferable that the adapter sleeves be provided in a number of graded series of sizes.

Figure 3:
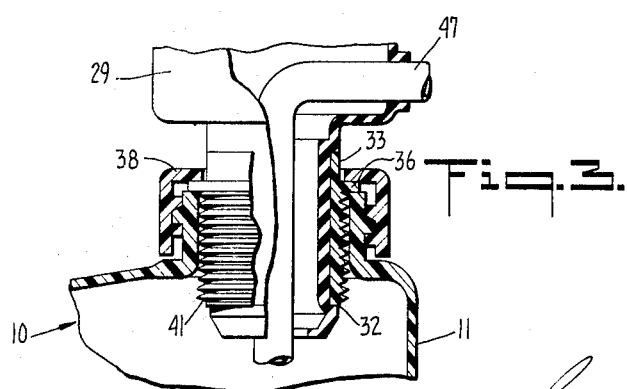
FIGURE 3 is a fragmentary elevation view with portions broken away of a modified form of adapter coupling sleeve in accordance with the invention.

With each of the series a standard internal sleeve diameter is employed, which internal diameter may be any standard external conduit, tubing or pipe size. Inasmuch as any given diameter tubular member may be employed with a variety of larger diameter tubular members, the sleeves of any given series thereof for employment with a given corresponding smaller diameter member must be provided with shoulders 36 and fins 41 of varied dimensions in order to accommodate the variety of larger diameter members that might be encountered. Thus, each series of sleeves comprises a number of constant internal diameter sleeves respectively having different diameter shoulders and fins. Where an external tubular member is only slightly larger than an internal tubular member to be coupled thereto, it will be appreciated that the fins of the adapter sleeve for facilitating the coupling are necessarily of only a slightly greater diameter than that of the sleeve proper. In other words, the radial projection of the fins from the sleeve body is slight and the fins somewhat resemble screw threads (see FIGURE 3). Such a situation prevails for the smaller size sleeves of each series thereof. By virtue of the minimized radial projection of the fins of the smaller size adapter sleeves, the centering action thereof would normally tend to be less than with the larger size sleeves wherein the radial projection of the fins is much greater. However, the foregoing tendency is obviated in the smaller size sleeves by providing a much increased number of fins as depicted in FIGURE 3. Thus the smaller size sleeves of each series have a large number of fins having relatively little radial projection.

For most purposes the adapter sleeves are molded of a flexible thermoplastic material preferably of a semi-rigid variety. In order to facilitate positioning on the aforesaid smaller diameter member, a plastic having some elasticity is employed whereby the sleeve may be more easily slipped upon the bulb neck or other second tubular member. A rigid flexible material may be used if ridge 22 were eliminated and a tight fitting sleeve were used. Also cementing or heat sealing methods might be employed for producing permanently assembled articles.

The compressible bulb 26 may be modified to provide a convenient dispenser, for example, by incorporating appropriate fittings. An orifice 42 may be formed in cylindrical neck portion 29 as may best be seen in FIGURE 1 with a circumjacent portion 43 of increased thickness to provide adequate strength. A conduit tube 44 may then be passed through orifice 42 in sealed relation as shown in FIGURE 1 with a diptube portion 46 thereof extending downwardly through bulb tip orifice 24 and with an outwardly projecting spout portion 47. For convenience, a flexible extension 48 may be attached to the diptube 46 to extend beneath the fluid level in container 10. A pressure bulb assembly of such a character may be used for dispensing a fluid from a container as described in my aforesaid copending application. More particularly, pressure applied to said bulb causes fluid to rise in said diptube and discharge from said spout. Upon release of the pressure upon said bulb the suction which is created withdraws the fluid from the diptube together with sufficient air to compensate for the quantity of fluid dispensed. The cycle may then be repeated. A simple compact dispenser requiring but a single opening is thereby provided. The bulb may be provided with a check valve orifice (not shown) and/or check valves may be provided in the conduit tube 44 to provide other types of pumping and dispensing means with some increase in complexity. However, with any of such bulbs or other mechanisms utilizing the hereinbefore disclosed coupling mechanism, various advantages accrue as described in the foregoing.

What is claimed is:

1. Coupling mechanism including in combination a first tubular section provided with an interior terminal cylindrical surface and an end face adjacent thereto, a second tubular section having an exterior surface adapted to receive an adapter sleeve thereon, a detachable adapter sleeve disposed upon said exterior surface of said second tubular section, said adapter sleeve having an outwardly flanged shoulder portion and a series of flexible circumferential fins provided on the exterior surface thereof, and means securing said second tubular section within the first tubular section with said fins of said adapter sleeve engaging the interior cylindrical surface of said first tubular section and said shoulder portion in abutment with said end face of said first section, whereby said sections are positioned and aligned in sealed relation.

2. Coupling mechanism as defined in claim 1 wherein said first tubular section includes an exteriorly threaded portion, and said securing means includes a locking ring rotatably positioned on said second tubular section and adapted to engage said threaded portion of said first tubular section.

3. Coupling mechanism including in combination a first tubular section provided with an exterior thread adjacent a planar end face thereof and having a cylindrical interior surface terminating in said end face, a second tubular section adapted to fit within said first tubular section, a detachable adapter sleeve disposed upon an exterior surface of said second tubular section, said adapter sleeve being provided with an outwardly flanged shoulder portion and having a series of flexible circumferential fins on the exterior surface thereof, and means including a rotatable locking ring mounted on said second tubular section engaging said exterior thread of said first section for securing said sections with the shoulder of said adapter sleeve in abutment with the end face of said first section and with said fins of the adapter sleeve engaging the cylindrical surface of said first tubular section, whereby said sections are aligned and positioned in sealed relation.

4. Coupling mechanism as defined in claim 3 wherein said second tubular member is fabricated of a rigid material, and said adapter sleeve is fabricated of a flexible material having at least limited extensibility to facilitate disposition upon said second tubular member.

5. A compressible bulb assembly adapted for use with a container provided with a cylindrical tubular neck outlet including in combination a compressible bulb having an elongated tubular neck extension adapted to fit within said container neck, an adapter sleeve disposed upon said bulb neck extension, said adapter sleeve being provided with an outwardly projecting series of circumferential fins, and means associated with said bulb neck for securing said bulb neck extension within said container neck with said sleeve fins engaging the interior surface of said neck to provide alignment of said tubular container neck and said bulb extension.

6. A compressible bulb assembly as defined in claim 5 wherein said adapter sleeve includes an outwardly flanged shoulder which is adapted to abut against the end of said container neck upon attachment of said bulb thereto.

7. A compressible bulb dispenser assembly adapted for use with a container having a cylindrical tubular neck outlet including in combination a compressible bulb provided with a relatively rigid collar portion and a rigid tubular bulb neck extension, an interchangeable adapter sleeve of slightly extensible plastic disposed upon said bulb neck extension, said adapter sleeve being provided with an outwardly flanged shoulder and a series of outwardly extending circumferential fins, tubular conduit means extending as a diptube through said bulb neck extension and transpiercing said collar portion to a spout portion projecting outwardly therefrom, and means assicated with said bulb neck for securing said neck extension within said container neck outlet with said shoulder in abutment therewith and said fins in engagement with interior surfaces of said outlet.

8. Coupling mechanism including in combination a first tubular section provided with an exterior thread adjacent a planar end face thereof and having a cylindrical interior surface terminating in said end face, a second tubular section adapted to fit within said first tubular section and having a constricted cylindrical exterior terminal surface including a raised ridge adjacent an end thereof, a detachable adapter sleeve fitted upon said constricted cylindrical surface of said second tubular section with an end thereof abutting against said ridge, said adapter sleeve being provided with an outwardly flanged shoulder portion and having a series of flexible circumferential fins on the exterior surface thereof, and means including a rotatable locking ring mounted on said second tubular section engaging said exterior thread of said first section for securing said sections with the shoulder of said adapter sleeve in abutment with the end face of said first section and with said fins of the adapter sleeve engaging the cylindrical surface of said first tubular section, whereby said sections are aligned and positioned in sealed relation.

References Cited by the Examiner

UNITED STATES PATENTS

| | | | |
|---|---|---|---|
| 697,835 | 4/02 | Giorgetti et al. | 222—209 |
| 1,986,484 | 1/35 | Schlueter | 222—545 |
| 2,154,393 | 4/39 | Bates | 222—209 X |
| 2,805,798 | 9/57 | Sampson | 200—400.8 X |
| 3,061,151 | 10/62 | Clare | 222—545 X |
| 3,090,529 | 5/63 | Lipman | 222—209 |

FOREIGN PATENTS

| | | |
|---|---|---|
| 1,201,761 | 7/59 | France. |
| 890,348 | 2/62 | Great Britain. |
| 313,954 | 7/56 | Switzerland. |

LOUIS J. DEMBO, *Primary Examiner.*

RAPHAEL M. LUPO, *Examiner.*